United States Patent
Hageman et al.

(10) Patent No.: US 9,673,846 B2
(45) Date of Patent: Jun. 6, 2017

(54) TEMPERATURE COMPENSATION SYSTEM AND METHOD FOR AN ARRAY ANTENNA SYSTEM

(71) Applicants: Michael L. Hageman, Mount Vernon, IA (US); Russell D. Wyse, Center Point, IA (US); James B. West, Cedar Rapids, IA (US)

(72) Inventors: Michael L. Hageman, Mount Vernon, IA (US); Russell D. Wyse, Center Point, IA (US); James B. West, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/849,491

(22) Filed: Sep. 9, 2015

(65) Prior Publication Data

US 2017/0070247 A1 Mar. 9, 2017

(51) Int. Cl.
| | |
|---|---|
| *H04B 1/04* | (2006.01) |
| *H04W 72/04* | (2009.01) |
| *H04B 7/06* | (2006.01) |
| *H03C 1/62* | (2006.01) |

(52) U.S. Cl.
CPC ......... *H04B 1/0475* (2013.01); *H04B 7/0617* (2013.01); *H04W 72/0406* (2013.01); *H04B 2001/0416* (2013.01)

(58) Field of Classification Search
CPC .......... H04B 7/084; H01Q 3/26; H01Q 3/267; H01Q 3/2694; H01Q 3/28; H01Q 3/36
USPC .......................... 455/25, 276.1; 342/354, 368
See application file for complete search history.

(56) References Cited

U.S. PATENT DOCUMENTS

| | | |
|---|---|---|
| 4,870,374 A | 9/1989 | Harris |
| 5,013,979 A | 5/1991 | Birleson |
| 5,414,433 A | 5/1995 | Chang |
| 5,592,179 A | 1/1997 | Windyka |
| 5,721,556 A | 2/1998 | Goutzoulis |
| 5,873,026 A | 2/1999 | Reames |
| 6,081,241 A | 6/2000 | Josefsson et al. |
| 6,133,868 A | 10/2000 | Butler et al. |

(Continued)

FOREIGN PATENT DOCUMENTS

WO WO-2007/023371 A1 3/2007

OTHER PUBLICATIONS

U.S. Appl. No. 13/714,209, filed Dec. 13, 2012, Wyse et al.

(Continued)

*Primary Examiner* — Lee Nguyen
(74) *Attorney, Agent, or Firm* — Donna P. Suchy; Daniel M. Barbieri

(57) ABSTRACT

A system and method compensates for temperature in a signal path of an antenna array. The signal path includes an antenna element, a first phase shifter or a time delay unit, and a first variable gain power amplifier. The system and method can provide at least one of a local temperature signal, a remote temperature signal, and both the local temperature signal and the remote temperature signal to a slope control circuit, and provide a phase control signal or a gain control signal using the slope control circuit at least partially in response to the at least one of the local temperature signal, the remote temperature signal, and both the local temperature signal and the remote temperature signal.

20 Claims, 8 Drawing Sheets

(56) References Cited

U.S. PATENT DOCUMENTS

| | | | |
|---|---|---|---|
| 6,191,735 | B1 | 2/2001 | Schineller |
| 6,413,896 | B1 | 7/2002 | Shimada et al. |
| 6,989,788 | B2 | 1/2006 | Marion et al. |
| 7,808,798 | B2 | 10/2010 | Cotte et al. |
| 8,466,846 | B1 | 6/2013 | Elsallal et al. |
| 8,659,499 | B1 | 2/2014 | Pluymers |
| 8,903,342 | B1 | 12/2014 | Wyse et al. |
| 8,907,817 | B1 | 12/2014 | Finley et al. |
| 9,083,350 | B1 * | 7/2015 | Posner .................. H03L 5/00 |
| 9,116,244 | B1 | 8/2015 | West et al. |
| 2002/0093453 | A1 | 7/2002 | Vail et al. |
| 2003/0189515 | A1 | 10/2003 | Jacomb-Hood et al. |
| 2005/0270219 | A1 * | 12/2005 | Dwelly .................. G01S 13/32 |
| | | | 342/22 |
| 2005/0275585 | A1 * | 12/2005 | Shima .................. G01S 7/4008 |
| | | | 342/174 |
| 2006/0068707 | A1 | 3/2006 | Greeley |
| 2006/0164284 | A1 | 7/2006 | Pauplis et al. |
| 2009/0231197 | A1 | 9/2009 | Richards |
| 2009/0251368 | A1 | 10/2009 | McCune, Jr. |
| 2010/0117917 | A1 | 5/2010 | Kindt et al. |
| 2010/0259446 | A1 | 10/2010 | Corman et al. |
| 2011/0109507 | A1 | 5/2011 | Warnick |
| 2011/0299456 | A1 | 12/2011 | Schmidt et al. |
| 2011/0305258 | A1 * | 12/2011 | Boutchich ................ G01J 5/12 |
| | | | 374/130 |
| 2012/0277590 | A1 | 11/2012 | Song et al. |
| 2012/0326781 | A1 * | 12/2012 | Mori ...................... H01Q 3/26 |
| | | | 330/127 |
| 2013/0235962 | A1 | 9/2013 | O'Keefe et al. |

OTHER PUBLICATIONS

U.S. Appl. No. 13/837,934, filed Mar. 15, 2013, West et al.
U.S. Appl. No. 14/300,021, filed Jun. 9, 2014, West et al.
U.S. Appl. No. 14/300,055, filed Jun. 9, 2014, West et al.
U.S. Appl. No. 14/300,074, filed Jun. 9, 2014, West et al.
U.S. Appl. No. 14/788,360, filed Jun. 30, 2015, Hageman et al.
Non-Final Office Action on U.S. Appl. No. 14/300,074, mail date Apr. 22, 2016, 20 pages.
Carchon et al. "Thin Film Technologies for Millimeter-Wave Passives and Antenna Integration" imec EuMW 2008 38th European Microwave Conference, pp. 1-46.
Final Office Action on U.S. Appl. No. 14/300,074, dated Sep. 27, 2016, 21 pages.
Non-Final Office Action on U.S. Appl. No. 14/300,055, dated Sep. 27, 2016, 7 pages.
Kraus, J.D. et al., Antennas for All Applications, Third Edition, McGraw-Hill Higher Education, p. 109, 2002.
Molisch, A.F. et al., Time Hopping and Frequency Hopping in Ultrawideband Systems, IEEE Pacific Rim Conference on Communications, Computers and Signal Processing, p. 541-544, 2003.
Non-Final Office Action on U.S. Appl. No. 14/300,021, dated Mar. 21, 2017, 19 pages.
Non-Final Office Action on U.S. Appl. No. 14/788,360, dated Feb. 24, 2017, 26 pages.
Notice of Allowance on U.S. Appl. No. 14/300,055, dated Apr. 5, 2017, 7 pages.

* cited by examiner

TEMPERATURE COMPENSATION SYSTEM AND METHOD FOR AN ARRAY ANTENNA SYSTEM

CROSS-REFERENCE TO RELATED PATENT APPLICATIONS

This application is related to U.S. application Ser. No. 14/788,360, filed on Jun. 30, 2015 by West et al., U.S. application Ser. No. 14/300,021, filed on Jun. 6, 2014 by West et al., U.S. application Ser. No. 14/300,074, filed on Jun. 6, 2014 by West et al., and U.S. application Ser. No. 14/300,055, filed on Jun. 6, 2014 by West et el., all assigned to the Assignee of the present application and hereby incorporated by reference in their entireties.

BACKGROUND

The present disclosure relates generally to the field of antenna systems. More specifically, the present disclosure relates generally to the field of antenna arrays including but not limited to, phased array antenna systems or electronically scanned array (ESA) antenna systems, such as active electronically scanned array (AESA) antenna systems.

Antenna arrays are utilized with transceivers. As used in this application, the term transceiver refers to an electronic device embodied as a transmitter, a receiver or a transmitter/receiver. The antenna array can be steered by using phase shifters and amplifiers coupled to respective antenna elements in the antenna array to direct the antenna at a pointing angle. The phase shifters can be variable phase shifters which provide a set of phase delays in response to a set of commands to direct the antenna to appropriate pointing angles without physically moving the antenna elements.

Temperature variations can affect the accuracy of phase and gain control in the antenna array and hence, the accuracy of beam positioning and beam symmetry. Certain applications, such as, radar systems, ground communication systems, satellite communication systems, sensor, etc., are especially sensitive to errors in phase and amplitude control. Therefore, temperature independent phase and gain control in the antenna array is desirable to reduce errors in phase and amplitude control.

Conventional antenna arrays have attempted temperature compensation at a sub-circuit element level within a signal path. However, not all sub-circuit elements are able to have self-temperature compensation circuits and compensation for each element in the transmit and receive chain is difficult to provide. In addition, process variations can cause non-uniform temperature variations in each sub-circuit element for which compensation is difficult on a sub-circuit element basis. Further, such conventional compensation systems add to the size, cost, power, and weight of the antenna array.

Thus, there is a need for a method of compensating for temperature variations in an antenna system which does not significantly add to the size, cost, power, and/or weight of the transceiver or antenna array. Further, there is a need for an antenna system with temperature compensation for a signal path between an antenna element and a splitter. Further still, there is a need for a robust AESA-based or other phased array antenna-based system with in-situ temperature compensation. Further still, there is a need for an AESA-based or other phased array antenna-based system with real time temperature compensation for individual receive and transmit chains. Further still, there is a need for an AESA-based or other phased array antenna-based system that compensates for gain variations due to temperature variations. Yet further still, there is a need for an AESA-based or other phased array antenna-based system that compensates for phase variations due to temperature variations. Yet further, there is a need for a robust temperature compensation scheme localized at each transmit and/or receive channel in an antenna array.

SUMMARY

In one aspect, the inventive concepts disclosed herein are directed to a system that compensates for temperature in a signal path of an antenna array. The signal path includes an antenna element, a first phase shifter or time delay unit, and a first variable gain power amplifier. The system provides at least one of a local temperature signal, a remote temperature signal, and both the local temperature signal and the remote temperature signal to a slope control circuit, and provides a phase control signal or a gain control signal using the slope control circuit at least partially in response to the at least one of the local temperature signal, the remote temperature signal, and both the local temperature signal and the remote temperature signal.

In a further aspect, the inventive concepts disclosed herein are directed to an antenna system. The antenna system includes signal paths; each signal path includes an antenna element, a phase shifter or time delay unit, a first variable gain power amplifier, and a temperature compensation circuit. The temperature compensation circuit includes a slope control circuit and a temperature variable gain amplifier. The temperature variable gain amplifier, the first variable gain power amplifier, the antenna element, the phase shifters and the variable gain power amplifier are disposed in series in each of the signal paths. The slope control circuit is configured to receive a first temperature signal and provide a gain control signal to the temperature variable gain amplifier to compensate for gain variation due to temperature variation in the signal path.

In a further aspect, the inventive concepts disclosed herein are directed to a method of compensating for temperature in a signal path of an antenna array. The signal path includes an antenna element, a first phase shifter or time delay unit, and a first variable gain power amplifier. The method includes providing a temperature signal to a slope control circuit to a second variable gain control amplifier in the signal path, and providing a gain control signal using the slope control circuit at least partially in response to the temperature signal.

In yet further aspect, the inventive concepts disclosed herein are directed to a method of compensating for temperature in a signal path of an antenna array. The signal path includes an antenna element, a first phase shifter or time delay unit, and a first variable gain power amplifier. The method includes providing at least one of a local temperature signal, a remote temperature signal, and both the local temperature signal and the remote temperature signal to a slope control circuit. The method also includes providing a phase control signal using the slope control circuit to a second phase shifter or providing a time delay control signal to a second time delay unit in the signal path at least partially in response to the at least one of the local temperature signal, the remote temperature signal, and both the local temperature signal and the remote temperature signal.

BRIEF DESCRIPTION OF THE DRAWINGS

Embodiments of the inventive concepts disclosed herein will become more fully understood from the following detailed description, taken in conjunction with the accompanying drawings, wherein like reference numerals refer to like elements, in which.

DETAILED DESCRIPTION

Figure 1:
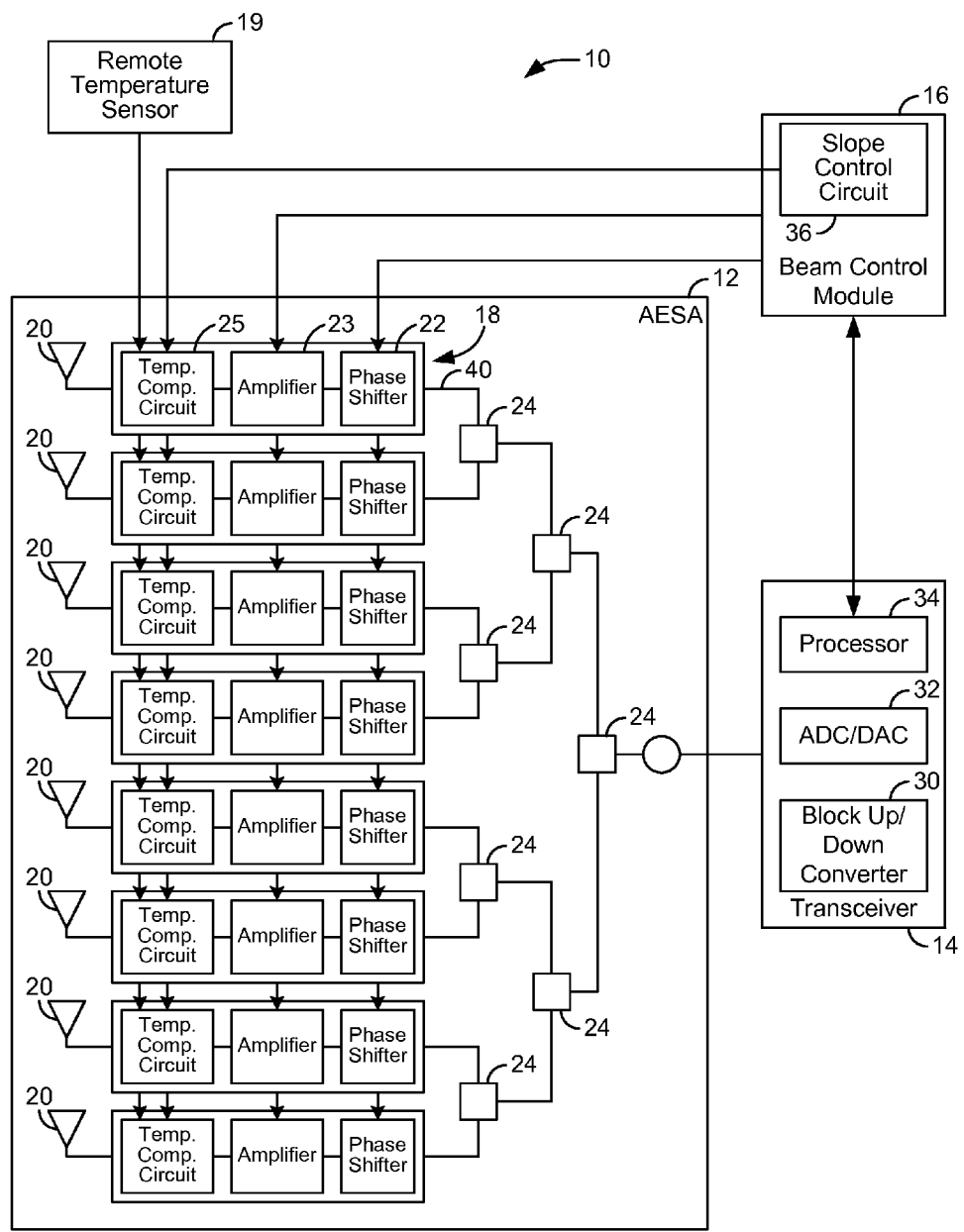
FIG. 1 is a block diagram of a transceiver, an antenna system including signal paths with temperature compensation, and a beam control circuit in accordance with some embodiments of the inventive concepts disclosed herein.

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the figures, a transceiver and an antenna system is shown and described that may be used in radar, sensor and communications systems. The transceiver and antenna system can utilize antenna arrays (e.g., electronically steerable antenna arrays). For example, the systems and methods described can be utilized in communication, sensing and/or radar systems, such as, military radar systems or weather radar systems, electronic intelligence (ELINT) receivers, electronic counter measure (ECM) systems, electronic support measure (ESM) systems, targeting systems or other systems. In some embodiments, the systems and methods are utilized to provide an ultra-wide band (UWB) system. The steerable antenna arrays can include but are not limited to phased-array antenna systems, electronically scanned array antenna systems, or electronically scanned array (ESA) antenna systems, such as active electronically-scanned array (AESA) antenna systems.

In some embodiments, phase and/or amplitude compensation with respect to temperature is provided within a signal path or cascade between an antenna element and a transceiver. In some embodiments, overall temperature compensation is performed at one location in each transmitter or receiver signal path. In some embodiments, a temperature compensation circuit in each signal path corrects for gain and/or insertion phase imperfections as a function of temperature for an entire transmit or receive chain. Chain-level temperature compensation advantageously removes topology complexity out of the chain sub-circuits and localizes the temperature compensation in the signal path in some embodiments. A temperature compensation circuit is employed in the signal path and is a high speed analog processor in some embodiments.

With reference to FIG. 1, a system 10 includes an antenna system 12, a transceiver 14, a beam control circuit 16, and a remote temperature sensor 19. The system 10 operates in a receive mode, transceiver mode or a transmit mode in some embodiments. The beam control circuit 16 can be provided within the antenna system 12, the transceiver 14, or as a discrete system. In some embodiments, parts of the beam control circuit 16 are integrated with the antenna system 12 and other parts of the beam control circuit 16 are integrated with the transceiver 14.

The system 10 can be or can be part of a sensing system, radar system, and communication system. In some embodiments, the system 10 can be part of an electronic intelligence (ELINT) receiver, an electronic countermeasure (ECM) system, a weather radar system, an electronic support measure (ESM) system, and/or hybrids thereof.

In some embodiments, the system 10 can employ multichip modules discussed in U.S. application Ser. No. 13/760,964 filed Feb. 6, 2013, Ser. No. 13/781,449, filed Feb. 28, 2013, and Ser. No. 13/837,934 filed Mar. 15, 2013, all of which are incorporated herein by reference in their entireties. In some embodiments, the system 10 can include components described in U.S. application Ser. No. 13/714,209 filed Dec. 13, 2012 and Ser. No. 13/737,777 filed Jan. 9, 2013, both incorporated herein by reference in their entireties. In some embodiments, the system 10 can include components described in U.S. application Ser. No. 14/788,360, filed on Jun. 30, 2015 West et al., incorporated herein by reference in its entirety.

The antenna system 12 can be a two-dimensional array or a single dimensional array in some embodiments. The antenna system 12 is utilized to point electronically at angles in one-dimensional or two-dimensional space in some embodiments. For example, beams may be aimed from an antenna system (e.g., an AESA antenna) by emitting waves that interfere constructively at certain angles in front of the antenna system 12. The antenna system 12 includes various components including apertures, power amplifiers, low noise amplifiers, phase shifters, transmit/receive switches, temperature sensing equipment, radio frequency (RF) power and phase delay sensing components, digital control and a beam steering computer in some embodiments. In some embodiments, the two-dimensional array or a single dimensional array of the antenna system 12 is circular, cylindrical, spherical, etc. and can be an arbitrarily curved surface, conformal to a vehicle surface, etc.

The antenna system 12 can be embodied as a Balanced Antipodal Vivaldi Array (BAVA) aperture, or other antenna system in certain embodiments. In some embodiments, array elements 20 are embodied as a dual polarization array, such as, the array shown in U.S. Pat. No. 8,466,846 which is incorporated herein by reference in its entirety.

The antenna system 12 includes signal paths 18 and a set of power dividers 24. Signal paths 18 each include an antenna element 20, a phase shifter 22, an amplifier 23, and a temperature compensation circuit 25. In some embodiments, each of the antenna elements 20 is associated with a respective phase shifter 22 and amplifier 23. The phase shifters 22 and the amplifiers 23 are controlled by the beam control circuit 16 which includes a slope control circuit 36. Radio frequency amplifiers, such as, amplifiers 23, can be provided before and after the phase shifters 22 in some embodiments.

The power dividers 24 can be arranged in various fashions to communicate signals between the elements 20 and transceiver 14. The power dividers 24 are power splitters or directional couplers in some embodiments. The power dividers 24 are passive elements in some embodiments.

The phase shifters 22 and the amplifiers 23 are vector modulator based phase shifters and variable gain amplifiers, respectively, and effect a set of phase shifts or phase delays and amplifier gains respectively, so that appropriate constructive interference is obtained. A set of control signals or commands can be provided from the beam control circuit 16 to control inputs on the phase shifters 22 and the amplifiers 23. The control commands set the appropriate phase shifts for the phase shifters 22 and gains for the amplifiers 23 to point the antenna system 12 at a pointing angle. In some embodiments, the amplifiers 23 each include two or more amplifiers.

The temperature compensation circuit 25 is an analog processor configured to adjust gain or phase in response to a locally measured temperature, in response to a remotely measured temperature, or in response to both the locally measured temperature and the remotely measured temperature. The locally measured temperature is associated with a measurement made on the integrated circuit associated with the signal path 18. The remotely measured temperature is provided by the remote temperature sensor 19 in some embodiments. In some embodiments, the temperature compensation circuit 25 uses one or more internal variable gain amplifiers to make gain adjustments and one or more internal variable phase shifters to make phase adjustments. In some embodiments, the temperature compensation circuit 25 uses the amplifier 23 in its signal path 18 to make gain adjustments and the phase shifter 22 in its signal path 18 to make phase adjustments.

In some embodiments, the temperature compensation circuit 25 is an analog processor configured to adjust gain or phase in response to a gain or phase slope temperature compensation function or operation. The gain or slope compensation operation adapts the gain or phase response of the signal path 18 to be relatively flat with respect to temperature. A slope control word is provided by the beam control circuit 16 to adjust the slope operation for gain or for phase in some embodiments (e.g., the temperature compensation circuit 25 has a programmable phase or gain control despite being an analog processor in some embodiments). The slope control word is provided from beam control circuit 16 and is determined from a calibration test in some embodiments. The calibration test can be performed after assembly of system 10, where temperature is varied and measured locally and remotely and the gain and phase response for each signal path 18 is characterized with respect to temperature.

The slope control word can be based upon empirical data related to remote and local temperature readings in some embodiments. The slope control word advantageously allows the temperature compensation circuit 25 to be designed for various types of signal paths and transceivers. The slope control word also advantageously allows the temperature compensation circuit 25 to accommodate process variations which affect phase and gain responses with respect to temperature.

In some embodiments, the temperature compensation circuit 25 is a high speed circuit capable of making gain and/or phase adjustments within 100 nanoseconds, within 50 nanoseconds, or within tens of nanoseconds. In some embodiments, the temperature compensation circuit 25 makes adjustments within 500 nanoseconds to meet waveform requirements for radars. For example, applications using pulse-to-pulse beam steering, dynamic pattern synthesis, and high rates of transmit receive toggling benefit from fast response times in some embodiments. The analog nature of the temperature compensation circuit 25 makes it more suitable for high speed adjustment than digital loop technology which has slower response times in some embodiments.

In some embodiments, the phase shifters 22, the amplifiers 23, the antenna elements 20, and the temperature compensation circuits 25 in each signal path 18 are coupled in series. The phase shifters 22, the amplifiers 23, and the temperature compensation circuits 25 are integrated on a Gallium Arsenide, Gallium Nitride, or Silicon Germanium substrate. The order of the phase shifters 22, the amplifiers 23, the antenna elements 20, and the temperature compensation circuits 25 in each signal path 18 is not shown in a limiting fashion. In some embodiments, additional elements or less than all the elements shown in FIG. 1 are provided in the signal path. In some embodiments, the phase shifters 22 are replaced by time delay circuits, such as those discussed in U.S. patent application Ser. No. 14/300,055 incorporated herein by reference in its entirety.

The transceiver 14 is provided on one or more RF integrated circuits, or modules in some embodiments. The transceiver 14 includes a block up/down converter 30, an analog-to-digital converter/digital-to-analog converter circuit 32, and an operational processor 34. Signals are transmitted to the antenna system 12 and received from the antenna system 12 through the block up/down converter 30. The block up/down converter 30 up converts transmitted signals from the converter circuit 32 and down converts signals received from the antenna system 12 in some embodiments. Signals for transmission from the operational processor 34 are converted to analog signals in the converter circuit 32 for the converter 30 in some embodiments.

Received signals from the converter 30 are converted to digital signals in the converter circuit 32 for the operational processor 34 in some embodiments.

The transceiver 14 can be a receiver only, transmitter only, or both a transmitter/receiver. The transceiver 14 can be embodied as a hard wired circuit, ASIC, programmable logic device, operational processor or combination thereof.

The beam control circuit 16 can be a software module operating on a computer platform or the operational processor 34, an ASIC, a programmable logic device, a hardware circuitry, or a mixture of thereof. The beam control circuit 16 provides a set of phase shift commands to the phase shifters 22 and gain commands to the amplifiers 23 to effect the pointing angle in some embodiments. In some embodiments, the set of phase shift commands and gain commands are provided in response to a beam pointing angle parameter and a frequency parameter. In some embodiments, the set of phase shift commands and gain commands are provided in response to a beam pointing angle parameter, an environmental parameter, and a frequency parameter.

The remote temperature sensor 19 is physical separate from the signal paths 18 in some embodiments. The remote temperature sensor 19 provides a signal proportional to absolute temperature in some embodiments. The remote temperature sensor 19 is disposed external to a chip or integrated circuit packages associated with the signal paths 18 in some embodiments. The remote temperature sensor 19 is integrated with or part of the beam control circuit 16 in some embodiments. In some embodiments, the remote temperature sensor 19 senses temperature at an ASEA board level.

Figure 2A:
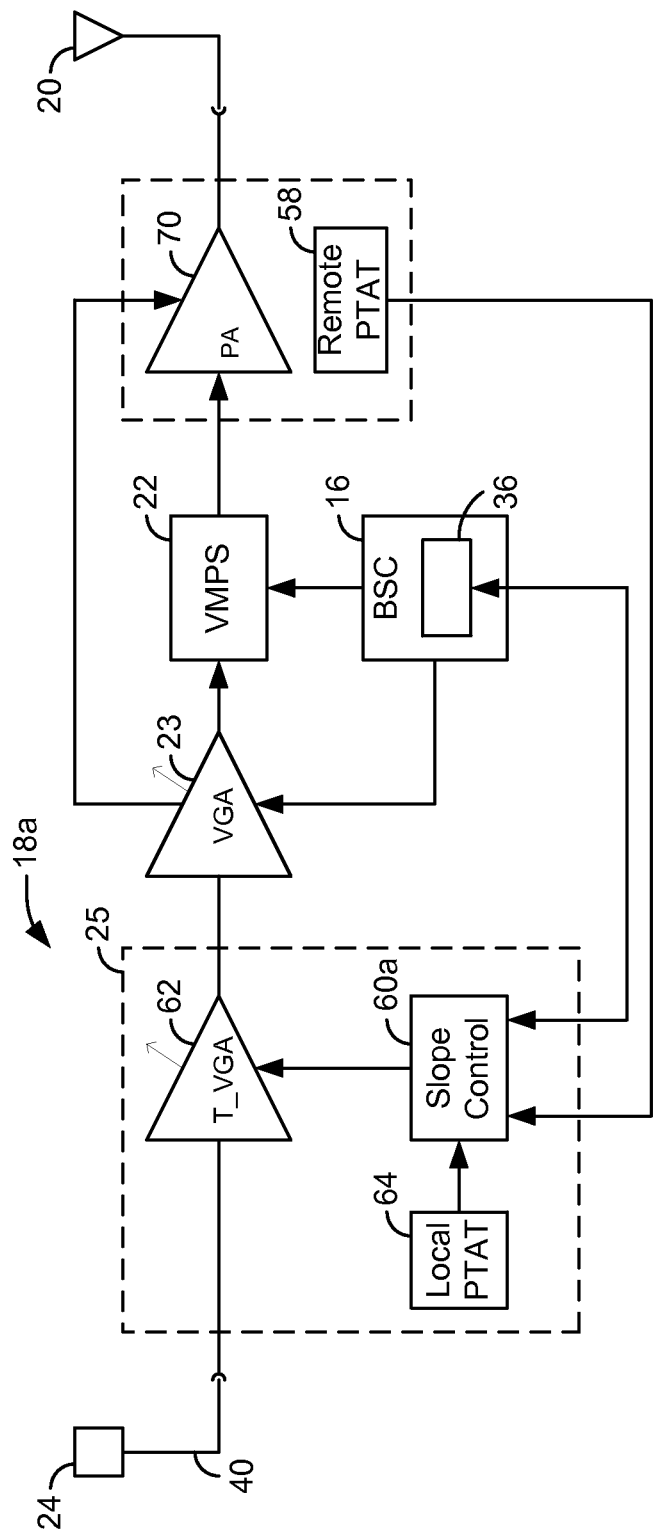
FIG. 2A is a more detailed block diagram of a transmit signal paths with temperature compensation for the transceiver illustrated in FIG. 1 in accordance with some embodiments of the inventive concepts disclosed herein.
Figure 2B:
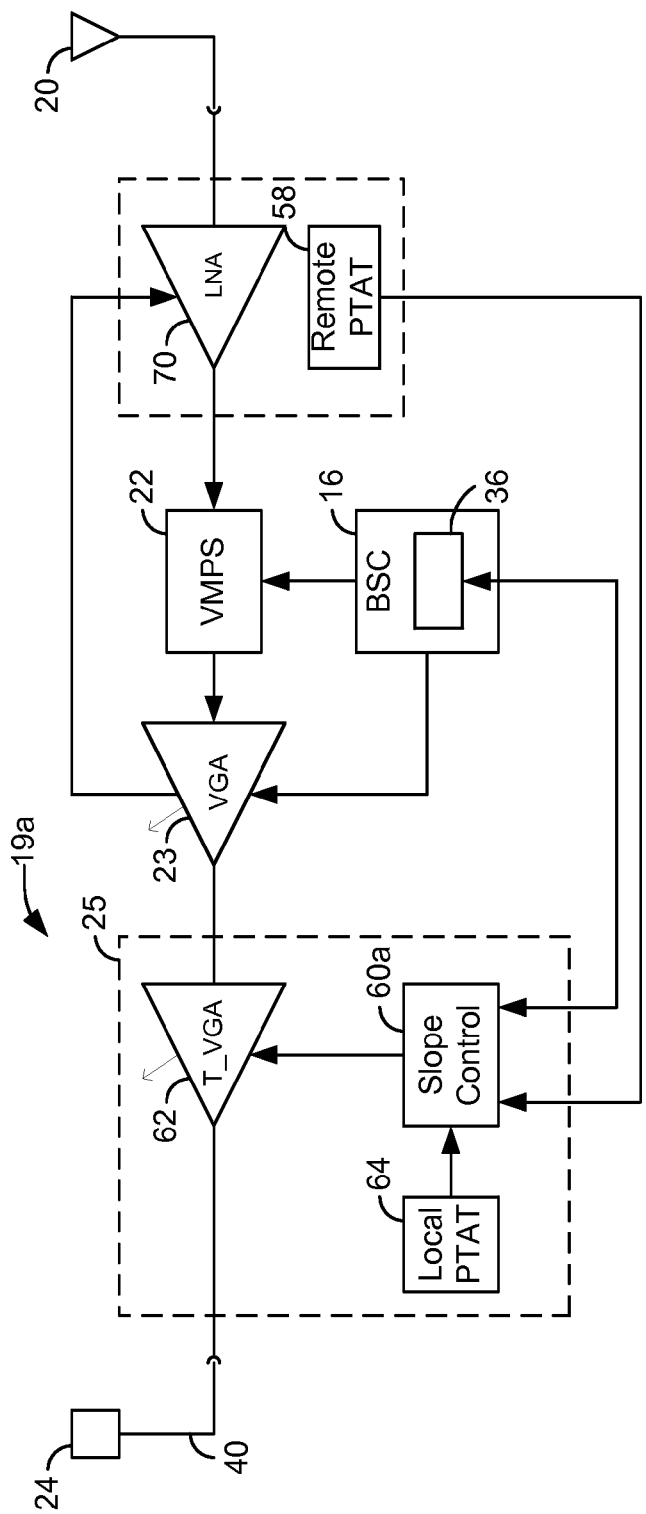
FIG. 2B is a more detailed block diagram of a receiver path with temperature for the transceiver illustrated in FIG. 1 in accordance with some embodiments of the inventive concepts herein.

With reference to FIGS. 2A-B, signal paths 18a and 19a are similar to the signal path 18 (FIG. 1) and are between antenna element 20 and a node 40 associated with the splitter 24. Antenna element 20 is optional in some embodiments. With reference to FIG. 2A, the signal path 18a can be a transmit path. The signal path 18a includes the phase shifter 22 or a time delay element, the amplifier 23, the temperature compensation circuit 25a (e.g., similar to the temperature compensation circuit 25), and the antenna element 20. An amplifier 70 is coupled in series with the phase shifter 22. The amplifier 70 is a power amplifier coupled between the phase shifter 22 and the antenna element 20 in the signal path 18a.

With reference to FIG. 2B, a signal path 19a is similar to the signal path 18 (FIG. 1) and is configured as a receive path. The signal path 19a includes the phase shifter 22 or time delay unit, the amplifier 23, the temperature compensation circuit 25a (e.g., similar to the temperature compensation circuit 25), and the antenna element 20. The amplifier 70 is a low noise amplifier coupled between the node 40 and the phase shifter 22 in the signal path 19a.

With reference to FIGS. 2A-B, the amplifier 70 can be an off or on-chip device that has a different temperature profile with respect to other components in the signal paths 18a or 19a. The amplifier 70 can be coupled to temperature compensation circuit 25a instead of phase shifter 22 in some embodiments. The amplifier 70 has a slave bias control input 72 coupled to a slave bias control output 74 of the amplifier 23. Amplifier 70 is optional in some embodiments.

The temperature compensation circuit 25 includes a slope control circuit 60a, a variable gain amplifier 62, and a local temperature sensor 64. The slope control circuit 60a receives a local temperature signal from the local temperature sensor 64 and a remote temperature signal from the remote temperature sensor 19 and provides a gain control signal to variable gain amplifier 62 to adjust the gain of the signal path 18a or 19a to remove or mitigate gain variations due to temperature variations. In some embodiments, the slope control circuit 60a only uses one of the remote temperature signal or the local temperature signal. The local temperature sensor 64 provides a signal that is a proportional to absolute temperature and is integrated with the temperature compensation circuit 25 in some embodiments. The remote temperature sensor 19 is integrated with the amplifier 70 in some embodiments.

Figure 3A:
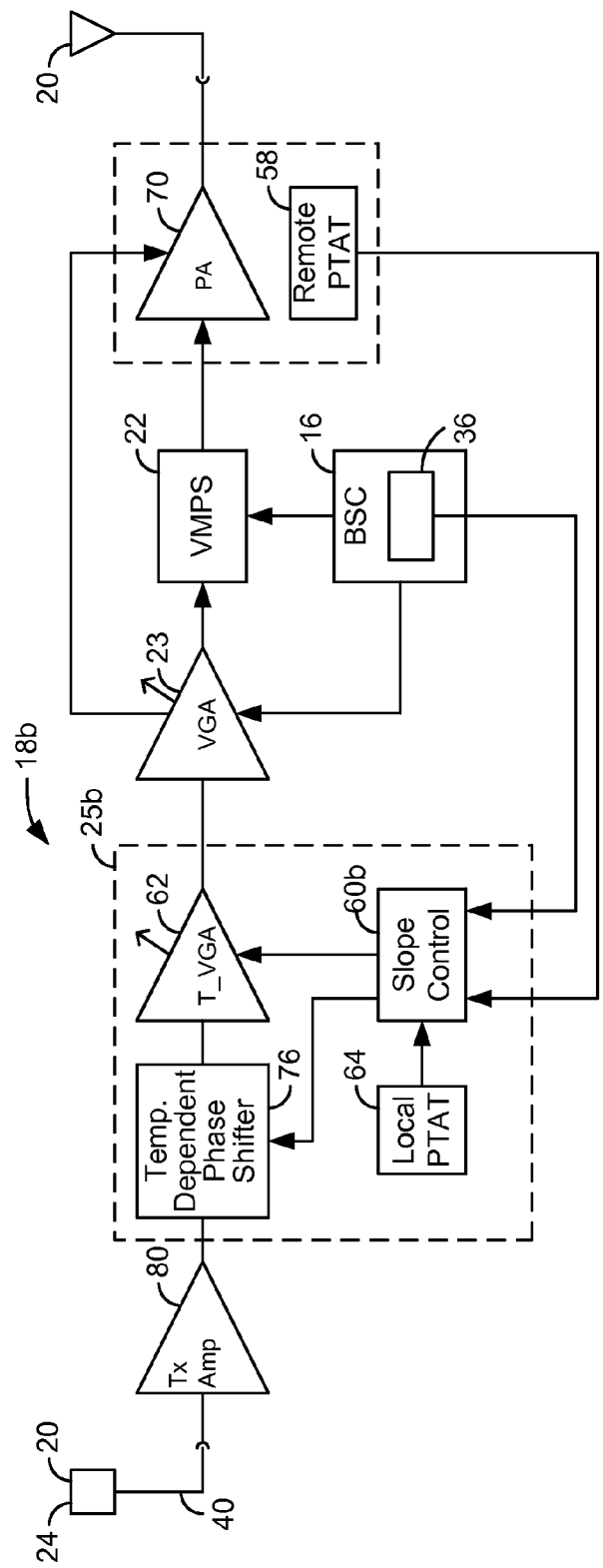
FIG. 3A is a more detailed block diagram of a transmit signal path with temperature compensation for the transceiver illustrated in FIG. 1 in accordance with some embodiments of the inventive concepts disclosed herein.
Figure 3B:
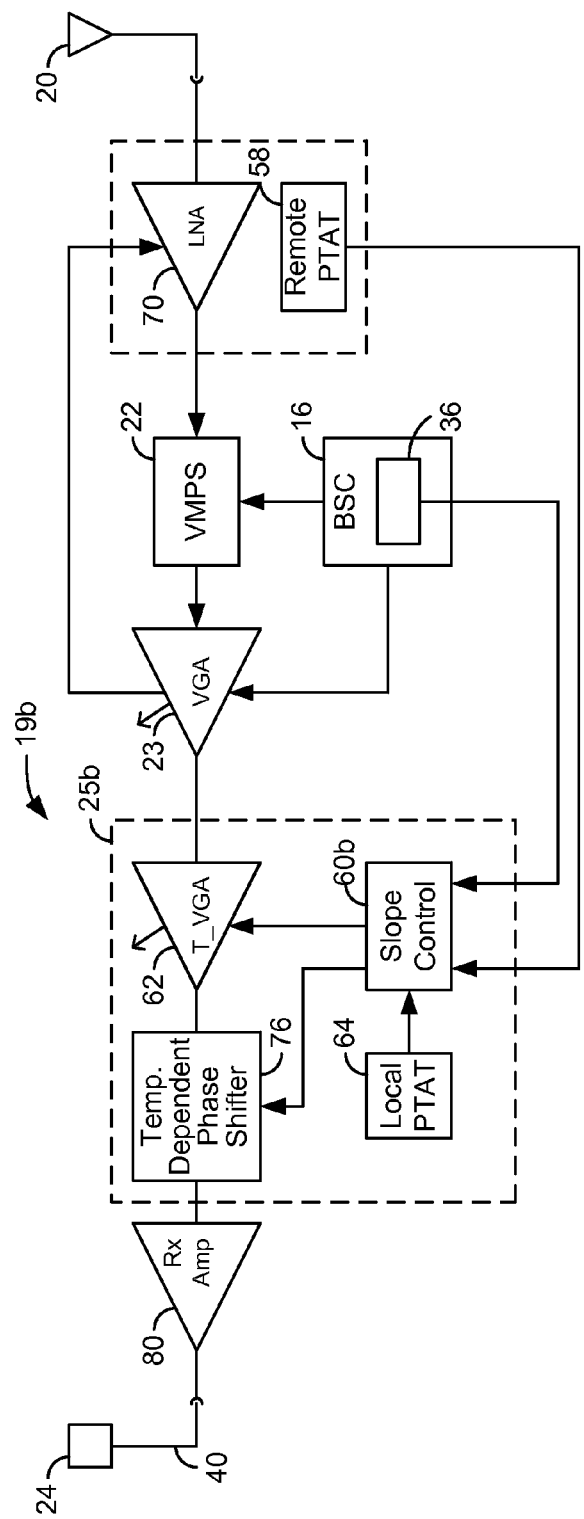
FIG. 3B is a more detailed block diagram of a receive path with temperature compensation for the transceiver illustrated in FIG. 1 in accordance with some embodiments of the inventive concepts disclosed herein.

With reference to FIG. 3A, a signal path 18b is similar to the signal path 18 (FIG. 1) and is between antenna element 20 and a node 40 associated with the splitter 24. The signal path 18b can be a transmit path as is shown in FIG. 3A. The signal path 18b includes the phase shifter 22 or a time delay unit, the amplifier 23, a phase shifter 76, a temperature compensation circuit 25b (e.g., similar to the temperature compensation circuit 25), and the antenna element 20. With reference to FIG. 3B, a signal path 19b is similar to the signal path 18 (FIG. 1) and is between antenna element 20 and a node 40 associated with the splitter 24. The signal path 19b can be a receive path as is shown in FIG. 3B. The signal path 19b includes the phase shifter 22 or a time delay unit, the amplifier 23, a phase shifter 76, the temperature compensation circuit 25b (e.g., similar to the temperature compensation circuit 25), and the antenna element 20.

With reference to FIGS. 3A-B, the temperature compensation circuit 25b can adjust one or both of the phase or gain associated with the signal paths 18b and 19b. The phase shifter 76 is a vector modulator based phase shifter in some embodiments. An amplifier 80 is coupled in series with the phase shifter 22 and the phase shifter 76 in some embodiments. In the signal path 18b (FIG. 3A), the amplifier 70 is a power amplifier coupled between the phase shifter 22 and the antenna element 20. In the signal path 19b (FIG. 3B), the amplifier 70 is a low noise amplifier coupled between the phase shifter 22 and the antenna element 20. The amplifier 80 is an off-chip device or an on-chip device with respect to the chip associated with phase shifter 22, the temperature compensation circuit 25 and the amplifier 23 in some embodiments. The amplifier 80 is a transmit amplifier in the signal path 18b and a receive amplifier in the signal path 19b and is optional in some embodiments. The remote temperature sensor 19 is integrated with the amplifier 80 in some embodiments.

The temperature compensation circuit 25 includes a slope control circuit 60b, the variable gain amplifier 62, the local temperature sensor 64, and a phase shifter 76. The slope control circuit 60b receives a local temperature signal from the local temperature sensor 64 and a remote temperature signal from the remote temperature sensor 19 and provides a gain control signal to variable gain amplifier 62 to adjust the gain of the signal path 18b or 19b to remove or mitigate gain variations due to temperature variations. In some embodiments, the slope control circuit 60 only uses one of the remote temperature signal or the local temperature signal.

The slope control circuit 60b receives the local temperature signal from the local temperature sensor 64 and the remote temperature signal from the remote temperature sensor 19 and provides a phase control signal to the phase shifter 76 to adjust the phase of the signal path 18b or 19b to remove or mitigate phase variations due to temperature variations. In some embodiments, the phase shifter 76 is a time delay unit that is controllable to provide a time delay in response a time delay control signal provided by the slope control circuit 60b. In some embodiments, the slope control circuit 60b can activate selected delay paths to provide the appropriate adjustment for the time delay using time circuitry described in U.S. patent application Ser. No. 14/300,055 incorporated herein by reference in its entirety. In some embodiments, the slope control circuit 60b only uses one of the remote temperature signal or the local temperature signal. In some embodiments, the slope control circuit 60b only adjusts one of gain or phase in response to temperature. The phase shifter 76 and the amplifier 62 as well as local temperature sensor 64 and the remote temperature sensor 19 have response times in less than 100 nanoseconds, within 50 nanoseconds, or tens of nanoseconds.

Figure 4:
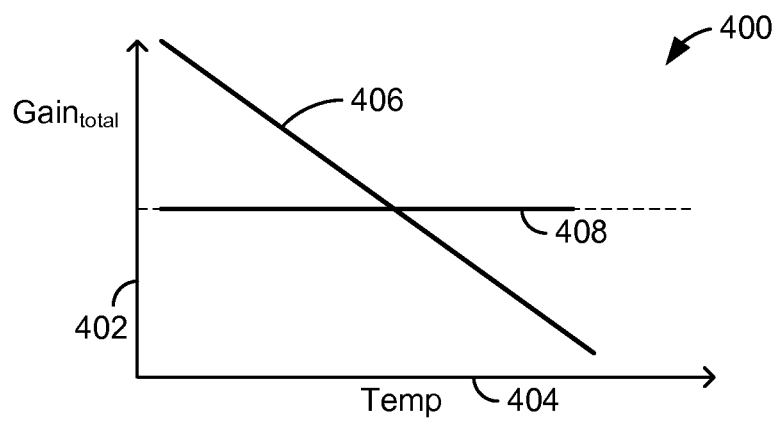
FIG. 4 is a chart showing a gain parameter versus temperature for the signal path illustrated in FIG. 2 in accordance with some embodiments of the inventive concepts disclosed herein.

With reference to FIG. 4, a chart 400 includes a Y axis 402 representing gain in the signal path 18a (FIG. 2) and an X axis 404 representing temperature. In some embodiments, the temperature range is between −55 and 155 degrees Centigrade. A line 406 represents uncorrected gain versus temperature in the signal path 18a or 19a. A line 408 represents corrected gain versus temperature in the signal path 18a or 19a. In some embodiments, the slope control circuit 60a applies a function to transform the gain response to temperature associated with the line 406 to be according to the line 408. The slope control word can be used to set the appropriate slope for such transformation in some embodiments. In some embodiments, the line 406 can be determined for the signal path 18a during calibration. The gain in the signal paths 18b or 19b (FIGS. 3A-B) can be similarly corrected.

Figure 5:
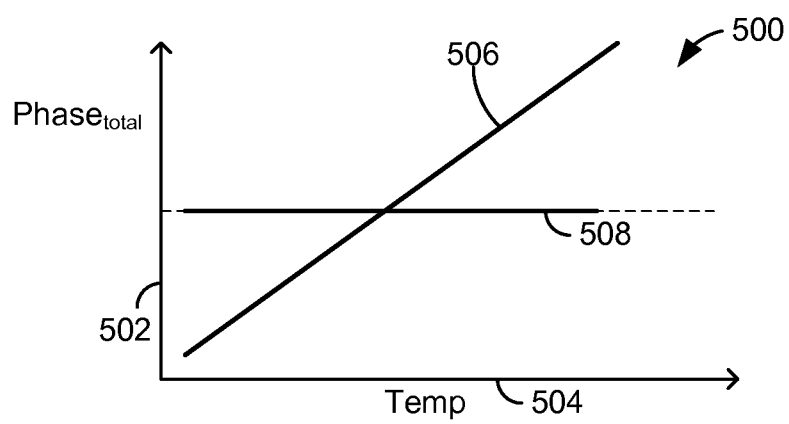
FIG. 5 is a chart showing a phase parameter versus temperature for the signal path illustrated in FIG. 3 in accordance with some embodiments of the inventive concepts disclosed herein.

With reference to FIG. 5, a chart 500 includes a Y axis 502 representing phase in the signal path 18b (FIG. 3) and an X axis 504 representing temperature. A line 506 represents uncorrected phase versus temperature in the signal path 18b or 19b. A line 508 represents corrected phase versus temperature in the signal path 18b or 19b. In some embodiments, the slope control circuit 60b applies a function to transform the phase response to temperature associated with the line 506 to be according to the line 508. The slope control word can be used to set the appropriate slope for such transformation in some embodiments. In some embodiments, the line 506 can be determined for the signal path 18b during calibration.

Although lines 406 and 506 are linear in FIGS. 4 and 5, other responses are possible including but not limited to curves, parabolic step functions, and other polynomial functions. Curve fitting algorithms can be used to calculate slope control words for transforming the temperature response in some embodiments.

Figure 6:
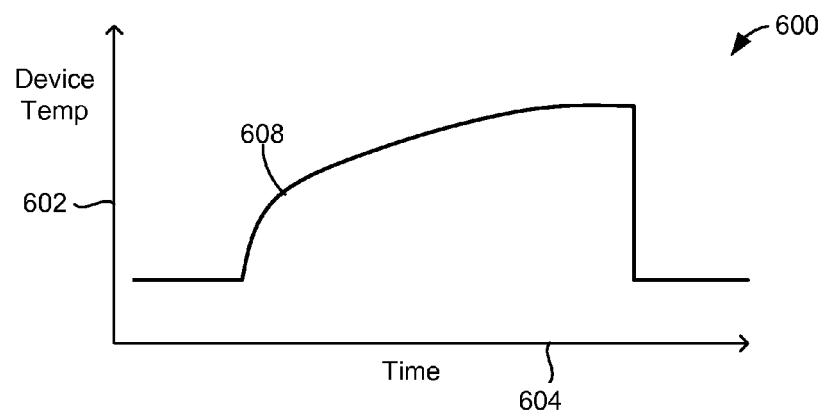
FIG. 6 is a chart showing device temperature versus time associated with a radio frequency signal on the signal path illustrated in FIG. 3 in accordance with some embodiments of the inventive concepts disclosed herein.
Figure 7:
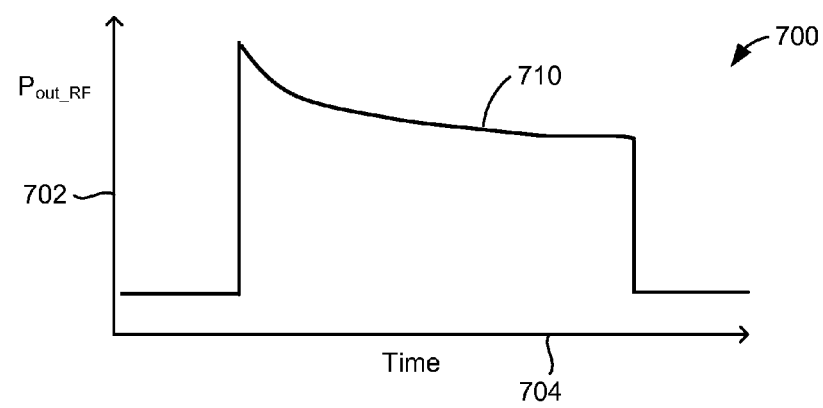
FIG. 7 is a chart showing radio frequency power versus time associated with the radio frequency signal associated with the device temperature response illustrated in FIG. 6 in accordance with some embodiments of the inventive concepts disclosed herein.

With reference to FIG. 6, a chart 600 includes a Y axis 602 representing device temperature (e.g., temperature associated with the path 18b (FIG. 3)) and an X axis 604 representing time. The device temperature is associated with localized heating of devices associated with the signal paths 18, 18a-b, and 19a-b. With reference to FIG. 7, a chart 700 includes a Y axis 702 representing radio frequency signal power in the signal path 18b (FIG. 3) and an X axis 704 representing time. A line 608 (FIG. 6) represents temperature versus time as a radio frequency pulse associated with a line 710 is provided in the signal path 18b or 19b. The line 710 represents the power of the radio frequency signal versus time. In some embodiments, the pulse length is less than 500 nanoseconds. The device temperature (e.g., the line 608) increases over time as the radio frequency pulse (represented by the line 710) is provided and returns to a normal temperature once the radio frequency pulse is no longer provided. The power of the radio frequency pulse decreases (e.g., due to gain variation) in response the temperature increase in some embodiments. Accordingly, self-heating in the signal path 18 is accommodated by a fast response to temperature by slope control circuit 60a in some embodiments.

Figure 8:
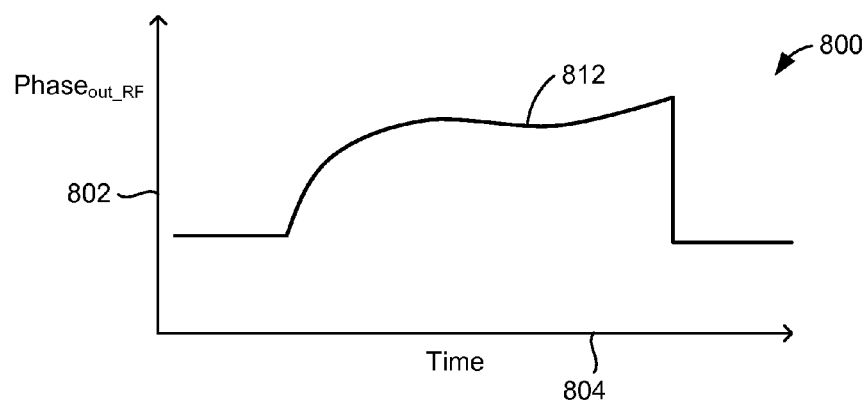
FIG. 8 is a chart showing phase versus time associated with the radio frequency signal associated with the device temperature response illustrated in FIG. 6 in accordance with some embodiments of the inventive concepts disclosed herein.
Figure 9:
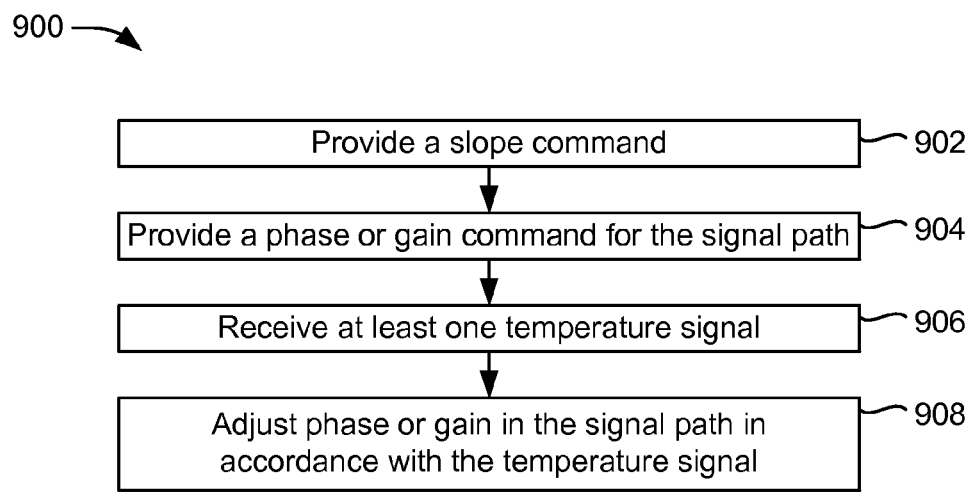
FIG. 9 is a diagram of an operational flow for temperature compensation for the signal paths illustrated in FIG. 1 in accordance with some embodiments of the inventive concepts disclosed herein.

With reference to FIG. 8, a chart 800 includes a Y axis 802 representing phase of the radio frequency signal in the signal path 18b or 19b (FIGS. 3A-B) and an X axis 804 representing time. A line 812 represents phase versus time as a radio frequency pulse associated with the line 710 is provided in the signal path 18b. The phase represented by the line 812 increases with the device temperature as represented by the line 608.

As shown in FIGS. 6-8, insertion phase and gain are a function of temperature for devices in signal paths 18, 18a, and 18b such as, silicon germanium variable gain amplifiers and phase shifters and gallium arsenide and gallium nitride power amplifiers. Using the temperature compensation circuits 25, 25a, and 25b in the respective signal paths 18, 18a, 18b, 19a, and 19b allows the different small signal and drive dependent gain and phase temperature dependencies to be accommodated at lower cost.

With reference to FIGS. 1-3 and 9, the system 10 can utilize an operational flow 900. Flow 900 can be performed for each of the signal paths 18 illustrated in FIG. 1 in some embodiments.

At an operation 902, a slope command can be provided to the temperature compensation circuit 25. The slope command can define the adjustment of gain, phase or both gain and phase with respect to temperature for a signal path 18. At an operation 904, a phase and gain can be set for the signal path using a digital phase shift command from the beam control circuit 16.

At an operation 908, the temperature compensation circuit 25 receives at least one of a local temperature signal, a remote temperature signal, and both the local temperature signal and the remote temperature signal. The temperature signals can be provided by the remote temperature sensor 19 (FIG. 2) or the local temperature sensor 64. In some embodiments, using both a local temperature signal and a remote temperature sensor signal allows more precise adjustment in the signal paths 18a (FIG. 2A) and 18b (FIG. 3A) or the signal paths 19a (FIG. 2A) and 19b (FIG. 3A). The slope control circuits 90a and 90b can make gain and/or phase adjustments in response to both the remote and local temperature values in real time according to an empirical remote temperature response and an empirical local temperature response. The temperature changes in response to self-heating due to radio frequency signals in the signal path 18 in some embodiments.

At an operation 908, the temperature compensation circuit 25 (FIG. 1) adjusts the gain or phase of the signal path 18 so that the gain, phase, or both the gain and phase response with respect to temperature is relatively flat in some embodiments. The slope control circuit 60a (FIG. 2) or 60b (FIG. 3) can provide an adjustment or control signal to the amplifier 62 or the phase shifter 66 to effect the gain or phase adjustment in response the at least one of the local temperature signal, the remote temperature signal, and both the local temperature signal and the remote temperature signal.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

The present disclosure contemplates methods, systems and program products on any machine-readable media for accomplishing various operations. Embodiments of the inventive concepts disclosed herein may be implemented using existing computer operational flows, or by a special purpose computer operational flows for an appropriate system, incorporated for this or another purpose, or by a hardwired system. Embodiments within the scope of the inventive concepts disclosed herein include program products comprising machine-readable media for carrying or having machine-executable instructions or data structures stored thereon. Such machine-readable media can be any available media that can be accessed by a special purpose computer or other machine with an operational flow. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with an operational flow. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a special purpose computer, or special purpose operational flowing machines to perform a certain function or group of functions.

What is claimed is:

1. An antenna system, comprising:
   a remote temperature sensor configured to provide a remote temperature signal;
   a plurality of signal paths, wherein each signal path comprises:
      a local temperature sensor configured to provide a local temperature signal indicative of a temperature in a signal path of the signal paths, wherein the remote temperature signal is indicative of a temperature outside of the signal paths;
      an antenna element;
      a phase shifter or time delay unit;
      a variable gain power amplifier; and
      a temperature compensation circuit comprising a slope control circuit and a temperature variable gain amplifier; and
      wherein the temperature variable gain amplifier, the antenna element, the phase shifter, and the variable gain power amplifier are disposed in series in the signal path of the plurality of signal paths, wherein the slope control circuit is configured to receive the remote temperature signal and the local temperature signal and provide a gain control signal to the temperature variable gain amplifier to compensate for gain variation due to temperature variation in the signal path.

2. The system of claim 1, wherein the temperature compensation circuit is an analog signal processor having a response time to temperature correction under 100 nanoseconds.

3. The system of claim 2, wherein the temperature compensation circuit is an analog processor having a response time to temperature correction under 30 nanoseconds.

4. The system of claim 1, wherein the remote temperature sensor is not integrated with an integrated circuit for the temperature compensation circuit.

5. The system of claim 4, wherein the remote temperature sensor is integrated with a power amplifier.

6. The system of claim 5 wherein the remote temperature signal is proportional to an absolute temperature.

7. The system of claim 6, wherein the local temperature sensor is integrated with an integrated circuit in the signal path.

8. The system of claim 1, wherein the temperature compensation circuit further comprises a temperature dependent phase shifter or time delay element, and the slope control circuit is configured to provide a phase control signal to the temperature dependent phase shifter or provide a time delay control signal to the time delay element to compensate for phase variation due to the temperature variation in the signal path.

9. The system of claim 8, wherein the local temperature sensor is integrated with the temperature compensation circuit.

10. The system of claim 1, wherein a beam control circuit is configured to provide a gain control signal to the variable gain power amplifier and a phase control signal to the phase shifter to control the gain of the variable gain amplifier and the phase of the phase shifter to effect beam steering.

11. A method of compensating for temperature in a signal path of an antenna array, the method comprising:
   providing a remote temperature signal and a local temperature signal to a slope control circuit in the signal path, the signal path comprising an antenna element, a first phase shifter or a time delay unit, and a first variable gain power amplifier, the local temperature signal being indicative of a local temperature in the signal path and the remote temperature signal being indicative of a remote temperature outside of the signal path; and
   providing a gain control signal using the slope control circuit at least partially in response to the remote temperature signal and the local temperature signal to a second variable gain control amplifier in the signal path.

12. The method of claim 11, further comprising providing a phase control signal using the slope control circuit at least partially in response to at least one of the remote temperature signal, the local temperature signal, or both the remote temperature signal and the local temperature signal to a second phase shifter in the signal path.

13. The method of claim 11, wherein the slope control circuit is an analog processor providing the gain control signal to flatten the signal path gain over temperature.

14. The method of claim 11,
   wherein the remote temperature signal is provided by an integrated circuit outside of the signal path.

15. The method of claim 14, further comprising:
receiving a slope control word in the slope control circuit.

16. A method of compensating for temperature in a signal path of an antenna array, the method comprising:
providing a local temperature signal and a remote temperature signal to a slope control circuit in the signal path, the signal path comprising an antenna element, a first phase shifter or time delay unit, and a first variable gain power amplifier, the local temperature signal being indicative of a local temperature in the signal path and the remote temperature signal indicative of being a remote temperature outside of the signal path; and
providing a phase control signal using the slope control circuit at least partially in response both the local temperature signal and the remote temperature signal to a second phase shifter or a second time delay unit in the signal path.

17. The method of claim 16, further comprising providing a gain control signal using the slope control circuit at least partially in response to the at least one of the local temperature signal, the remote temperature signal, and both the local temperature signal and the remote temperature signal to a second variable gain amplifier in the signal path.

18. The method of claim 17, wherein the slope control circuit is an analog processor providing the gain control signal to flatten the signal path gain over temperature.

19. The method of claim 17, wherein the gain control signal is provided at least partially in response to the remote temperature signal.

20. The method of claim 17, wherein the local temperature signal is provided to the slope control circuit, wherein the gain control signal is provided at least partially in response to the local temperature signal.

* * * * *